(12) United States Patent
Eick et al.

(10) Patent No.: US 8,662,243 B2
(45) Date of Patent: Mar. 4, 2014

(54) BASEPLATE DAMPENING PAD

(75) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/192,277

(22) Filed: Jul. 27, 2011

(65) Prior Publication Data

US 2012/0048641 A1 Mar. 1, 2012

Related U.S. Application Data

(60) Provisional application No. 61/378,164, filed on Aug. 30, 2010.

(51) Int. Cl.
  *G01V 1/04* (2006.01)
(52) U.S. Cl.
  USPC .......................... 181/113; 181/114; 181/121
(58) Field of Classification Search
  USPC ................................ 181/108, 113, 114, 121
  See application file for complete search history.

(56) References Cited

U.S. PATENT DOCUMENTS

| | | | |
|---|---|---|---|
| 3,557,900 A | 1/1971 | Kilmer | |
| 4,020,919 A | 5/1977 | Broding | |
| 4,296,828 A | 10/1981 | Layotte et al. | |
| 4,323,145 A | 4/1982 | Allen | |
| 4,637,002 A | 1/1987 | Sallas | |
| 5,875,589 A | 3/1999 | Lai et al. | |
| 6,552,961 B1 | 4/2003 | Bremner et al. | |
| 8,000,168 B2 | 8/2011 | Eick et al. | |
| 8,004,931 B2 | 8/2011 | Eick et al. | |
| 2007/0240930 A1 | 10/2007 | Wei et al. | |

FOREIGN PATENT DOCUMENTS

CA 1147842 6/1983

*Primary Examiner* — Jeremy Luks
(74) *Attorney, Agent, or Firm* — ConocoPhillips Company

(57) ABSTRACT

The invention relates to a sweep-type vibratory seismic source where a baseplate is put to the ground and a series of impulses are applied through the baseplate into the ground and where the baseplate may periodically de-couple from the ground during the delivery of the impulses. A de-coupling baseplate tends to undertake a very high frequency flexing while high frequency energy is being delivered to the ground. The high frequency flexing may be picked up by the vibrator control system and interpreted as an unintended signal being delivered into the ground. While there are already issues getting high frequency data in the return wave field, allowing the vibrator electronics to alter the actual signal in a manner intended to squelch the high pitched ringing of the baseplate is apt to reduce the high frequency data in the data record. One solution for reducing the de-coupling and the ringing of the baseplate is a dampening pad positioned between the baseplate and the ground.

18 Claims, 2 Drawing Sheets

BASEPLATE DAMPENING PAD

CROSS-REFERENCE TO RELATED APPLICATIONS

This application is a non-provisional application which claims benefit under 35 USC §119(e) to U.S. Provisional Application Ser. No. 61/378,164 filed Aug. 30, 2010, "Baseplate Dampening Pad," which is incorporated herein in its entirety.

STATEMENT REGARDING FEDERALLY SPONSORED RESEARCH OR DEVELOPMENT

None.

FIELD OF THE INVENTION

This invention relates to the acquisition of seismic data and especially to vibratory sources that provide seismic energy into the ground and create reflections from subsurface geology that is received and recorded in the form of seismic data.

BACKGROUND OF THE INVENTION

Historically, the acquisition of seismic data was accomplished by creating an explosion that propagated a broad frequency spectrum of seismic energy into the ground. The energy carried down into the ground reflecting and refracting off and through the various strata below the surface and the returning wavefield was recorded. This type of seismic acquisition was slow and dangerous.

In the 1950's, Conoco developed sweep-type vibrators that reduced the energy intensity of the explosion by spreading the smaller energy over a longer period of time as shown in U.S. Pat. Nos. 2,688,124, 3,024,861, 3,073,659, 3,159,233, 3,209,322, and 3,293,598, etc., for example. This certainly improved safety while still providing a frequency spectrum of energy into the ground. Sweep-type vibrators have now been in common use for over 50 years. The seismic surveys accomplished with sweep-type seismic sources are reliable and consistent and, most importantly, are safer than taking explosives into the field. However, it has long been recognized that high frequency energy provides a level of detail in the seismic record that is highly desirable, but the intensity or amplitude of the high frequency energy in the data record has been less than desirable.

Conventional efforts to increase the recordable high frequency energy have been primarily focused on providing longer sweeps or to lengthen the proportion of the sweep time for which the higher frequency energy is delivered into the ground. As a sweep-type vibrator delivers the seismic energy into the ground, it records each sweep and computes an approximate ground force delivered into the ground for use by a feedback circuit to control the vibe. This ground force approximation is used in subsequent analysis in seismic data processing. Conventional vibrator technology uses a weighted-sum method to approximate the "ground force" during a sweep. In 1984, Sallas derived the weighted-sum method to approximate the true ground force. See J. J. Sallas, Seismic Vibrator Control and the Downgoing P-Wave, GEOPHYSICS 49(6) (1984) 732-40. The weighted-sum method assumes that a baseplate acts as a rigid body, and that a full coupling between the baseplate and the ground is achieved. Under these assumptions, the weighted-sum ground force is obtained by summing the weighted baseplate and reaction mass accelerations. The Sallas approximation or equation may be written as:

$$-F_g = M_r A_r + M_b A_b,$$

where $M_r$=Mass of the reaction mass (kg); $M_b$=Mass of the baseplate (kg); $A_r$=Reaction mass acceleration (m/s$^2$); $A_b$=Baseplate acceleration (m/s$^2$); and $F_g$=Compressive force exerted on the earth by the baseplate (N). This is normally reported as the ground force of the vibrator.

The dynamics of vibrator systems seems to inherently limit the power that is deliverable into the ground at high frequency. A low frequency is delivered by a longer, slower stroke of the reaction mass while a higher frequency stroke is fast and typically shorter in length. While the Sallas approximation indicates that a fast stroke of shorter length provides equal force to the ground, the absence of the higher frequency data in the data traces or records from the field could mean that either the true force is not what is approximated by the Sallas equation or that consistent force across a broad frequency spectrum does not deliver consistent energy delivery across a broad frequency spectrum.

BRIEF SUMMARY OF THE DISCLOSURE

The invention more particularly relates to a vibratory seismic source comprising a baseplate having a bottom surface and arranged to be put to the ground to deliver seismic energy into the ground. The source further includes a system for vibrating the baseplate and a dampening pad attached to the baseplate and positioned to be between bottom surface of the baseplate pad and the ground when the seismic source is delivering seismic energy into the ground.

The invention further relates to a method of obtaining seismic data relating to geological structures under the surface of the earth using a vibratory seismic source wherein the method includes providing a seismic vibrator having a metallic baseplate, a bottom surface of the baseplate and a dampening pad attached to the baseplate. The baseplate is lowered to the ground such that the dampening pad is sandwiched between the baseplate and the ground and the baseplate is vibrated to deliver seismic energy into the ground. The returning wavefield of seismic energy that are reflected and refracted by the geological structures under the surface is then recorded.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
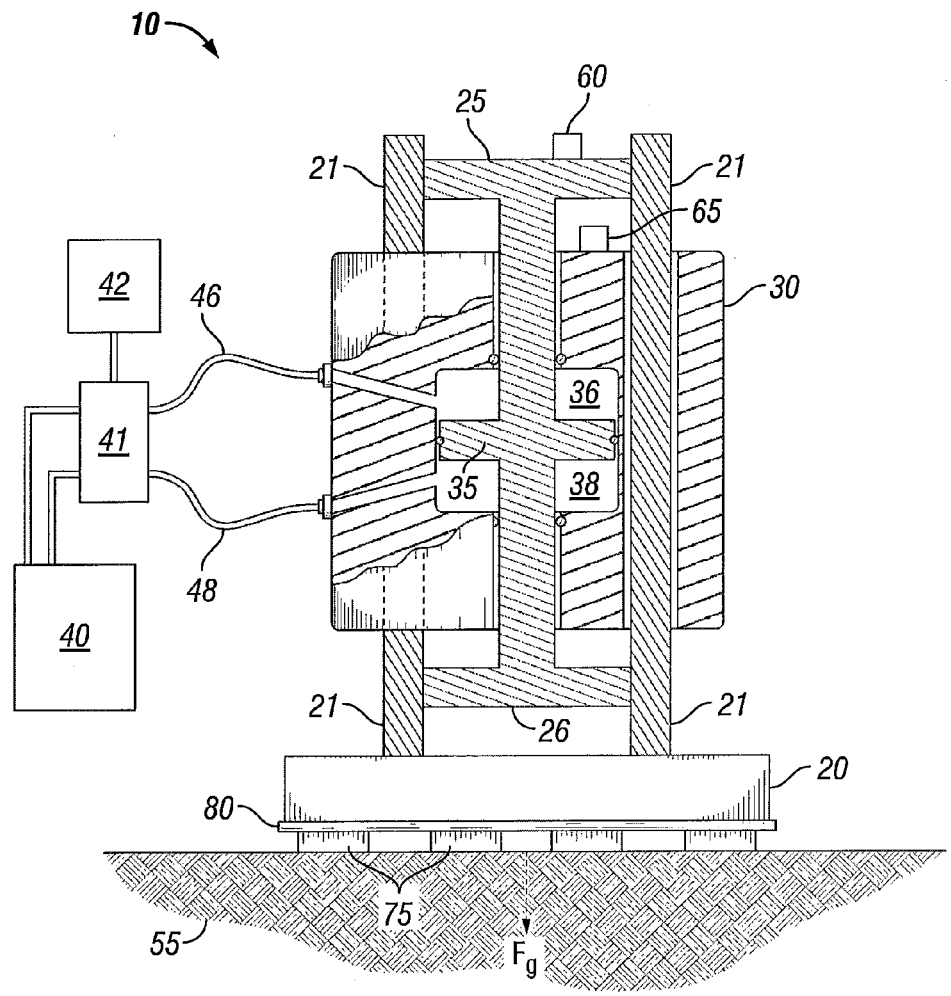
FIG. 1 is cross-sectional view of a seismic vibrator with a dampening pad positioned between the baseplate and load sensors to dampen out fluctuations in the baseplate flexures and distortions caused by forces of the vibrator while the baseplate is positioned on top of the load sensors.

As noted above, it has been difficult to acquire suitable high frequency data when using sweep-type vibratory seismic sources and investigations pursuant to the present invention have turned toward an analysis of the energy that sweep-type vibratory seismic sources are actually putting into the ground in hopes of increasing the presence of high frequency data in the returning wavefield. The analysis begins with a seismic vibrator that one would plan to use in a seismic survey. For explaining the invention, a conventional sweep-type vibratory seismic source is illustrated in FIG. 1 and is now explained.

A simplified version of the operable portion of a conventional seismic vibrator is generally indicated by the arrow 10. The primary operative element is baseplate 20 that is lowered to the ground 55 and held down typically using the weight of the vehicle that carries vibrator 10. Typically, vibrator 10 is carried along under the belly of the vehicle and lowered to the ground once located at a shot point or source point. While the weight of the vehicle is used to hold the baseplate to the ground, it is typically isolated from the intense vibration by pneumatic dampeners that are not shown. The second operative element of the vibrator is reaction mass 30 that is positioned to slide up and down along guide rods 21. The reaction mass 30 is a heavy and substantial sized block of metal. The reaction mass 30 is intended to be forcefully moved up and down to create impulses that are passed into the ground 55 through baseplate 20.

The reaction mass 30 is driven up and down along guide rods 21 by a hydraulic system, schematically indicated by box 40, where hydraulic fluid is delivered through a valving system 41 and into and through channels 46 and 48. Upper and lower cylinders 36 and 38 are rapidly filled and drained of hydraulic fluid to drive the reaction mass 30 relative to piston 35. Vibe controller 42 controls the valving system 41 thereby controlling the speed and direction of the reaction mass 30 and ultimately the frequency and force at which the reaction mass 30 moves. The hydraulic system 40 typically includes a diesel powered hydraulic pump. As noted above, this is the basic arrangement of a conventional sweep-type vibrator. A baseplate accelerometer 60 measures the acceleration of the baseplate 20 while a reaction mass accelerometer 65 is mounted on the reaction mass 30 to record the acceleration of the reaction mass 30.

Continuing with the discussion of the analysis of the seismic source, the vibrator 10 is operated to generate seismic energy, but using one or more load sensors between the baseplate 20 and the ground. As shown in FIG. 1, an array of load sensors 75 are placed under the baseplate 20 to more accurately measure the true ground force produced at each frequency to determine the actual ground force ($F_g$) applied to the earth over a range of frequencies. Load sensors are described in the publication "Load Cell System Test Experience: Measuring the Vibrator Ground Force on Land Seismic Acquisition", Shan, S., et al. *SEG Expanded Abstracts*, 0016-0020 (October 2009). Although it is known that vibes provide a ground source estimate that is used for inversion and subsequent data processing, it turns out that current vibrators do not provide accurate information about the ground force actually delivered to the ground. The load sensors provide more accurate data and this has been confirmed by experiments using seismic receivers installed in boreholes deep in the ground. It should be emphasized that these experiments confirmed two important observations. First, the vibrators do not actually impart the ground force to the earth. They report based on the ground force data computed by the vibrator controller based on the Sallas estimation, especially at higher frequencies. And secondly, the load sensors provide a relatively accurate ground force measurements across the frequency spectrum.

The information provided by the vibrator controller are sufficiently accurate at lower frequencies, but inaccuracy begins at about 35 Hz and the deviation increases as the frequency being delivered gets higher. The inaccuracy actually becomes unacceptable under most conventional ground conditions at frequencies of about 40 to 50 Hz in the sweep for most terrains using industry standard 60,000+ lbs vibrators. Specifically, most large industry standard seismic vibrators begin to reduce the actual ground force at about 35 Hz (as compared to what the vibrator actually reports via the vibe controller and the Sallas Approximation), and the ground force is quite variable above about 40 to 50 Hz. Much above 60 Hz and the forces in the sweeps are highly unstable and do not reflect the signal that is desired to be imparted to the ground and as reported by either the load cell data nor the data from the receivers in the well bore. In more simple and brutal terms, the vibe reports it is doing the sweep nearly perfectly and it is actually doing a terrible job actually putting the sweep into the ground. Essentially, the vibrators "lie" about how good of a job they are doing.

In a preferred embodiment, the true ground force imparted to the earth from a seismic vibrator is recorded using a load sensor device or an array of load sensor devices. The seismic vibrator controller electronics 42 is supplied a pilot sweep that represents the desired source signature. The pilot sweep is a sinusoidal function that varies in frequency with time. It is used by the valving system 41 as a representation for the desired motion of the baseplate 20 and reaction mass 30. The motion of the baseplate 20 is then translated into ground force through impulses with the earth. Ground force is actually weight that varies in time in a similar manner to the way the pilot sweep's sinusoidal shape varies in time. The ground force measured by the array of load sensors and the pilot sweep are then directly related and are also directly related to the desired true ground force.

Using the load sensors 75, it has been identified that, at higher frequencies, the baseplate 20 was actually separating from the load sensors 75. This "jumping" off of the load sensors is called "decoupling." With the baseplate 20 momentarily free of the load sensors 75 and then impacting them and free again was causing very high frequency flexing of the baseplate 20 that manifested as a ringing sound. The ringing of the baseplate 20 is actually perceived by the vibe controller 42 and interpreted to be a signal error. The vibe controller 42 actually altered the signal to the valving system 41 trying to compensate, which actually amplifies the signal deviation from what is desired to put into the ground.

Figure 2:
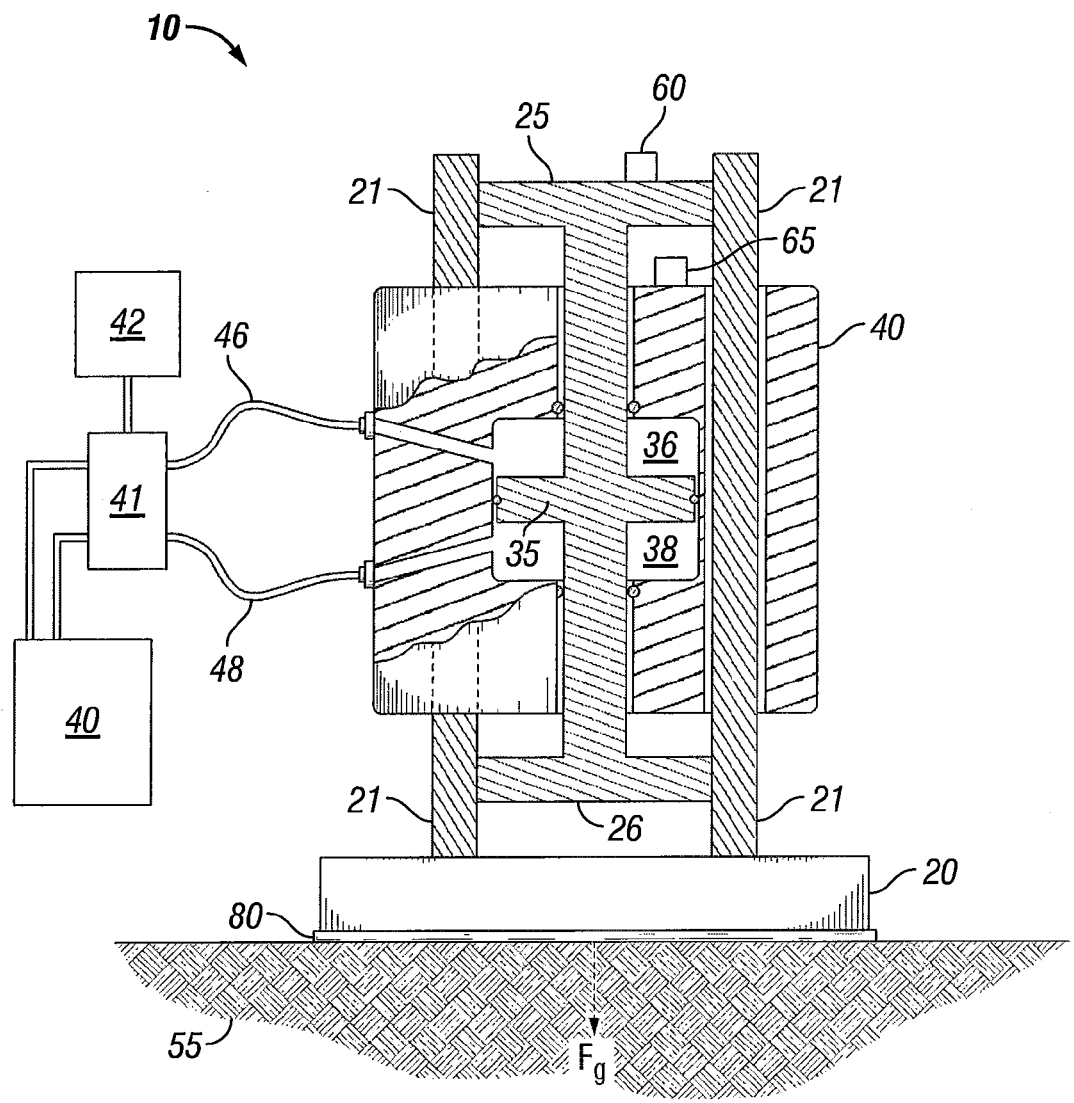
FIG. 2 is cross-sectional view of a seismic vibrator with a dampening pad positioned between the baseplate and the ground to dampen out fluctuations in the baseplate flexures and distortions caused by forces of the vibrator.

As frustrating as this problem is, one solution is actually quite simple. In FIG. 1, dampening pad 80 is provided between the load cells 75 and the baseplate 20. The dampening pad may be any suitable elastomeric or polymeric material that flexes so slightly as to absorb a portion of the impacts of the baseplate 20 against either the sensors 75 or the ground 55 as shown in FIG. 2. The dampening pad 80 especially absorbs the point load impacts where the ground might be uneven or have hard spots on stones or rocks. As such, the dampening pad 80 and the baseplate 20 do not de-couple from the ground and the baseplate 20 does not develop the high pitched ringing.

In practice, a simple rubber door mat was used as the dampening pad 80. It may be bonded to the bottom of the baseplate or attached around the perimeter of the baseplate 20 by bolts or clamps and allowed to float off the bottom of the baseplate when the baseplate 20 is lifted off the ground for transportation from one shot point to the next.

The dampening pad 80 may comprise an elastomer or plastic and may be formed in layers. The dampening pad 80 deforms to fill the imperfections (e.g., gaps) between the baseplate pad 20 and ground 55. The simple dampening pad 80 squelched the ringing of the baseplate 20 and increased the useable bandwidth of vibrator output signal within the limits of existing vibrator technology. In particular, the usable vibrator signal output is in the 4 Hz to 50 Hz range, or, possibly, in the 4 Hz to 60 Hz range. Without the pad 80, the seismic vibrator 10 generated a noisy output signal that looked reasonable on a ground force plot, but the output signal was actually quite unrealistic in terms of an actual ground force sweep, particularly, at higher frequencies.

As noted above, the dampening pad 80 may be made from one or more layers of elastomers and/or plastics. The elastomers include, but are not limited to, natural rubber, synthetic rubber, butyl rubber, polybutadiene rubber, styrene-butadiene rubber, nitrile rubber, chloroprene rubber, ethylene propylene rubber, ethylene propylene diene rubber, polyacrylic rubber, epichlorohydrin rubber, silicone rubber, fluorosilicone rubber, fluoroelastomers, perfluoroelastomers, polyether block amides, chlorosulfonated polyethylene, ethylene-vinyl acetate and mixtures thereof. Further, the elastomers also include thermoplastic elastomers, thermoplastic vulcanizates, thermoplastic polyurethane, thermoplastic olefins, polysulfide rubber and mixtures thereof. The plastics include, but are not limited to, polypropylene, polystyrene, acrylonitrile butadiene styrene, polyesters, polyamides (nylon), polyvinylchloride, polyurethanes, polycarbonates and mixtures thereof.

In another embodiment, the dampening pad 80 may be made from one or more elastomers and/or plastics as needed to tune out undesired vibrations. If the dampening pad 80 is made from multilayers of elastomers and/or plastics, the individual layers may be held together with fasteners or they may be fused with an adhesive. Suitable fasteners are well-known in the art, and include, but are not limited to, bolts, clamps and straps. Suitable adhesives include epoxy or other high strength adhesive.

In an embodiment, the dampening pad 80 may be shaped to fit the bottom surface of the baseplate 20, and attached to the bottom surface of the baseplate 20 with fasteners and/or adhesives. As discussed above, suitable fasteners include, but are not limited to, bolts, clamps and straps, and suitable adhesives include epoxy or other high strength adhesives.

A method of adapting a seismic vibrator to reduce decoupling and ringing of the vibrator baseplate includes testing of the seismic vibrator 10 with a dampening pad 80 while using the load sensors 75 while performing sweeps. Heavier and lighter pads may be substituted with the various signals being compared using the load sensors 75. In addition, several separate pads may be provided if a heavier dampening pad is needed.

In an embodiment, the dampening pad 80 may be made from one or more elastomers and/or plastics as needed to tune out undesired vibrations, as discussed above. If the dampening pad 80 is made from multilayers of elastomers and/or plastics, the individual layers may be held together with fasteners or they may be fused with an adhesive. As discussed above, suitable fasteners include, but are not limited to, bolts, clamps and straps, and suitable adhesives include epoxy or other high strength adhesives.

In an embodiment, the dampening pad 80 may be shaped to fit the bottom surface of the baseplate 20, and attached to the baseplate 20 with fasteners and/or adhesives. As discussed above, suitable fasteners include, but are not limited to, bolts, clamps and straps, and suitable adhesives include epoxy or other high strength adhesives.

In an embodiment, the dampening pad may be placed between the baseplate and the ground. In FIG. 2, the dampening pad 80 is positioned between the baseplate 20 and the ground 55 with the dampening pad 80 being fitted to the shape of the baseplate 20 and fastened to the baseplate 20 using suitable fasteners. This would be a standard configuration for imparting energy into the ground for production seismic acquisition projects. The dampening pad 80 would have dampening properties that are tuned to the surface conditions of the ground that best optimize the true ground force output from the vibrator 10.

As a result of the present invention, more accurate seismic data measurements may be obtained in the 40 Hz to 60 Hz range, and, possibly, in the 60 Hz to 70 Hz range. Accordingly, the usable vibrator signal output is in the 4 Hz to 60 Hz range, and, possibly, in the 4 Hz to 70 Hz range.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A vibratory seismic source comprising:
    a) a baseplate having a bottom surface and arranged to be put to the ground to deliver seismic energy into the ground;
    b) a system for vibrating the baseplate; and
    c) a dampening pad attached to the baseplate and positioned to be between bottom surface of the baseplate and the ground when the seismic source is delivering seismic energy into the ground
    wherein said dampening pad is removable such that heavier and lighter pads may be substituted with various signals being compared using load sensors.

2. The vibratory seismic source according to claim 1, wherein the dampening pad comprises an elastomer.

3. The vibratory seismic source according to claim 2, wherein the elastomer is selected from the group consisting of natural rubber, synthetic rubber, butyl rubber, polybutadiene rubber, styrene-butadiene rubber, nitrile rubber, chloroprene rubber, ethylene propylene rubber, ethylene propylene diene rubber, polyacrylic rubber, epichlorohydrin rubber, silicone rubber, fluorosilicone rubber, fluoroelastomers, perfluoroelastomers, polyether block amides, chlorosulfonated polyethylene, ethylene-vinyl acetate and mixtures thereof.

4. The vibratory seismic source according to claim 2, wherein the elastomer is selected from the group consisting of thermoplastic elastomers, thermoplastic vulcanizates, thermoplastic polyurethane, thermoplastic olefins, polysulfide rubber and mixtures thereof.

5. The vibratory seismic source according to claim 2, wherein the elastomer is selected from the group consisting of polypropylene, polystyrene, acrylonitrile butadiene styrene, polyesters, polyamides, polyvinylchloride, polyurethanes, polycarbonates and mixtures thereof.

6. The vibratory seismic source according to claim 2, wherein the dampening pad comprises individual layers of elastomers, plastics or combinations thereof held together with fasteners.

7. The vibratory seismic source according to claim 2, wherein the dampening pad comprises individual layers of elastomers, plastics or combinations thereof fused with an adhesive.

8. The vibratory seismic source according to claim 7, wherein the adhesive is an epoxy or other high strength adhesive.

9. The vibratory seismic source according to claim 1, wherein the dampening pad comprises a combination of two or more elastomers, plastics or combinations thereof.

10. A method of obtaining seismic data relating to geological structures under the surface of the earth using a vibratory seismic source wherein the method comprises the steps of:
   a) providing a seismic vibrator having a metallic baseplate, a bottom surface of the baseplate and a dampening pad attached to the baseplate;
   b) lowering the baseplate to the ground such that the dampening pad is sandwiched between the baseplate and the ground;
   c) vibrating the baseplate to deliver seismic energy into the ground; and
   d) recording the returning wavefield of seismic energy that are reflected and refracted by the geological structures under the surface wherein said dampening pad is removable such that heavier and lighter pads may be substituted with various signals being compared using load sensors.

11. The method according to claim 10, wherein the dampening pad comprises an elastomer.

12. The method according to claim 11, wherein the elastomer in the dampening pad is selected from the group consisting of natural rubber, synthetic rubber, butyl rubber, polybutadiene rubber, styrene-butadiene rubber, nitrile rubber, chloroprene rubber, ethylene propylene rubber, ethylene propylene diene rubber, polyacrylic rubber, epichlorohydrin rubber, silicone rubber, fluorosilicone rubber, fluoroelastomers, perfluoroelastomers, polyether block amides, chlorosulfonated polyethylene, ethylene-vinyl acetate and mixtures thereof.

13. The method according to claim 11, wherein the elastomer in the dampening pad is selected from the group consisting of thermoplastic elastomers, thermoplastic vulcanizates, thermoplastic polyurethane, thermoplastic olefins, polysulfide rubber and mixtures thereof.

14. The method according to claim 10, wherein the dampening pad comprises a plastic.

15. The method according to claim 14, wherein the plastic is selected from the group consisting of polypropylene, polystyrene, acrylonitrile butadiene styrene, polyesters, polyamides, polyvinylchloride, polyurethanes, polycarbonates and mixtures thereof.

16. The method according to claim 10, wherein the dampening pad comprises layers of materials including at least one elastomer layer.

17. The method according to claim 16, wherein the layers within the dampening pad are fused with an adhesive.

18. The method according to claim 10, wherein the dampening pad is attached to the baseplate with an adhesive.

* * * * *